United States Patent [19]

Botting et al.

[11] Patent Number: 5,085,401
[45] Date of Patent: Feb. 4, 1992

[54] LOW POWER VALVE ACTUATOR

[75] Inventors: Robert J. Botting, Simi Valley; Howard L. Ledeen, Flintridge, both of Calif.

[73] Assignee: H. L. Ledeen Associates, Sun Valley, Calif.

[21] Appl. No.: 552,885

[22] Filed: Jul. 16, 1990

[51] Int. Cl.$^5$ .................. F16K 31/04; F16K 31/528
[52] U.S. Cl. ................. 251/129.11; 251/129.12; 74/424.8 VA; 310/68 B; 310/68 C
[58] Field of Search ............ 251/129.11, 129.12, 251/58, 129.2; 310/68 B, 68 C; 74/424.8

[56] References Cited

U.S. PATENT DOCUMENTS

| 2,793,305 | 5/1957 | Gerentes | 310/68.8 |
| 3,640,140 | 2/1972 | Gulick et al. | 74/424.8 VA |
| 4,460,009 | 7/1984 | Nanci et al. | 251/58 X |
| 4,763,874 | 8/1988 | Ogawa | 251/129.11 X |
| 4,775,133 | 10/1988 | Ring et al. | 251/129.12 |

Primary Examiner—Arnold Rosenthal
Attorney, Agent, or Firm—Flehr, Hohbach, Test, Albritton & Herbert

[57] ABSTRACT

A low power valve actuator includes a small motor that rotates an Acme drive screw. The rotary motion of the drive screw is translated into linear motion of a drive nut-traveling block, which is guided along and held against rotation by a pair of spaced parallel guide rods. A cantilever pin carried on the traveling block engages in a groove extending longitudinally of, a Scotch yoke lever, which translates the linear motion back into rotary motion at a further mechanical advantage. The Scotch yoke lever is reinforced and strengthened by reason of the fact that the groove is not a through-slot, but extends only partially through the lever arm. The device is made more compact by reason of the fact that the groove in the Scotch yoke lever can actually extend over the top of the valve stem.

4 Claims, 3 Drawing Sheets

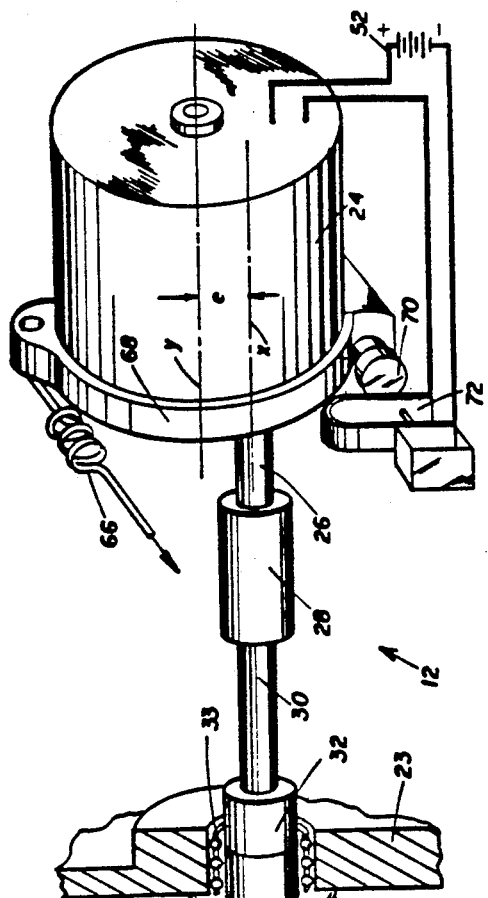
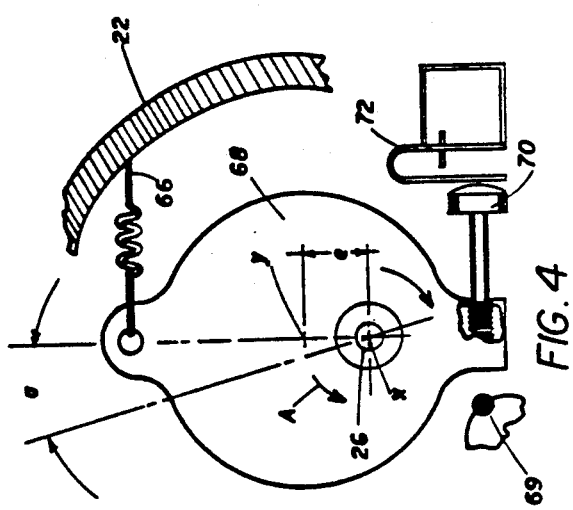
FIG. 4
FIG. 3

5,085,401

LOW POWER VALVE ACTUATOR

BACKGROUND OF THE INVENTION

There is an increasing demand for valve actuators, which are capable of turning a valve stem as on a quarter-turn valve, under relatively high torque achieved with a relatively low power source of electricity. For example, there may be a need to operate a valve at a remote location in a pipeline in response to a signal or in response to an emergency situation, such as a pipeline break. In many such situations, it is necessary, to operate a valve from a conventional twelve volt battery into which energy may be restored by a solar panel. The 12 volt D.C. source limits the magnetic forces that can be generated by the motor devices. Accordingly, the effective force application of the motor must be at the highest practical mechanical advantage ratio.

OBJECTS OF THE INVENTION

It is an object of this invention to provide a valve actuator which can operate from a low energy source at an extremely high mechanical ratio.

It is a further object of this invention to provide a valve actuator that can turn and precisely position a valve through 90°, while maintaining a self-locking facility and achieving a mechanical ratio in excess of 1:20,000.

It is a further object of this invention to provide a Scotch yoke device of extremely compact configuration.

Other objects and advantages of this invention will become apparent from the description to follow, particularly when read in conjunction with the accompanying drawings.

SUMMARY OF THE INVENTION

In carrying out this invention, we provide a traveling block that is driven along an Acme threaded rod, that is rotated but fixed against axial movement. At the same time, the traveling block is guided for linear movement along the rotating threaded rod, but it is firmly held against any rotation therewith. Hence, virtually all of the rotary motion delivered by the motor is converted into linear movement of the drive nut traveling block. The motor unit is provided with internal gears so that the output shaft delivers incremental rotary steps at a high mechanical ratio, in excess of 1:450. A pin extends downward from the traveling block in cantilever fashion, and is received in a groove extending longitudinally along a Scotch yoke lever. The groove does not go completely through the lever, so that the lever is strengthened and reinforced by the material below it. A female coupling is formed below the level of the groove to receive and drive the upper end of a valve stem and, since the groove and female coupling receptacle do not interfere, the cantilever pin can actually pass over the valve stem to enable a very short center to center distance allowing for a very compact structure. The motor drive is contained within a housing wherein it is not bolted down or otherwise firmly anchored, but reactive rotation of the motor is resisted by a spring. Hence, as torque builds up, as during valve closing, the motor will tend to rotate against the spring and, when torque increases to a level indicating that the valve is closed, the motor will rotate far enough to complete an electrical contact to activate a switch that deenergizes the motor.

BRIEF DESCRIPTION OF THE DRAWINGS

In the drawings:

FIG. 3 is a view in perspective of the low powered drive;

FIG. 4 is an end view of the motor drive showing the torque reactor for automatic cutoff.

DESCRIPTION OF A PREFERRED EMBODIMENT

Figure 1:
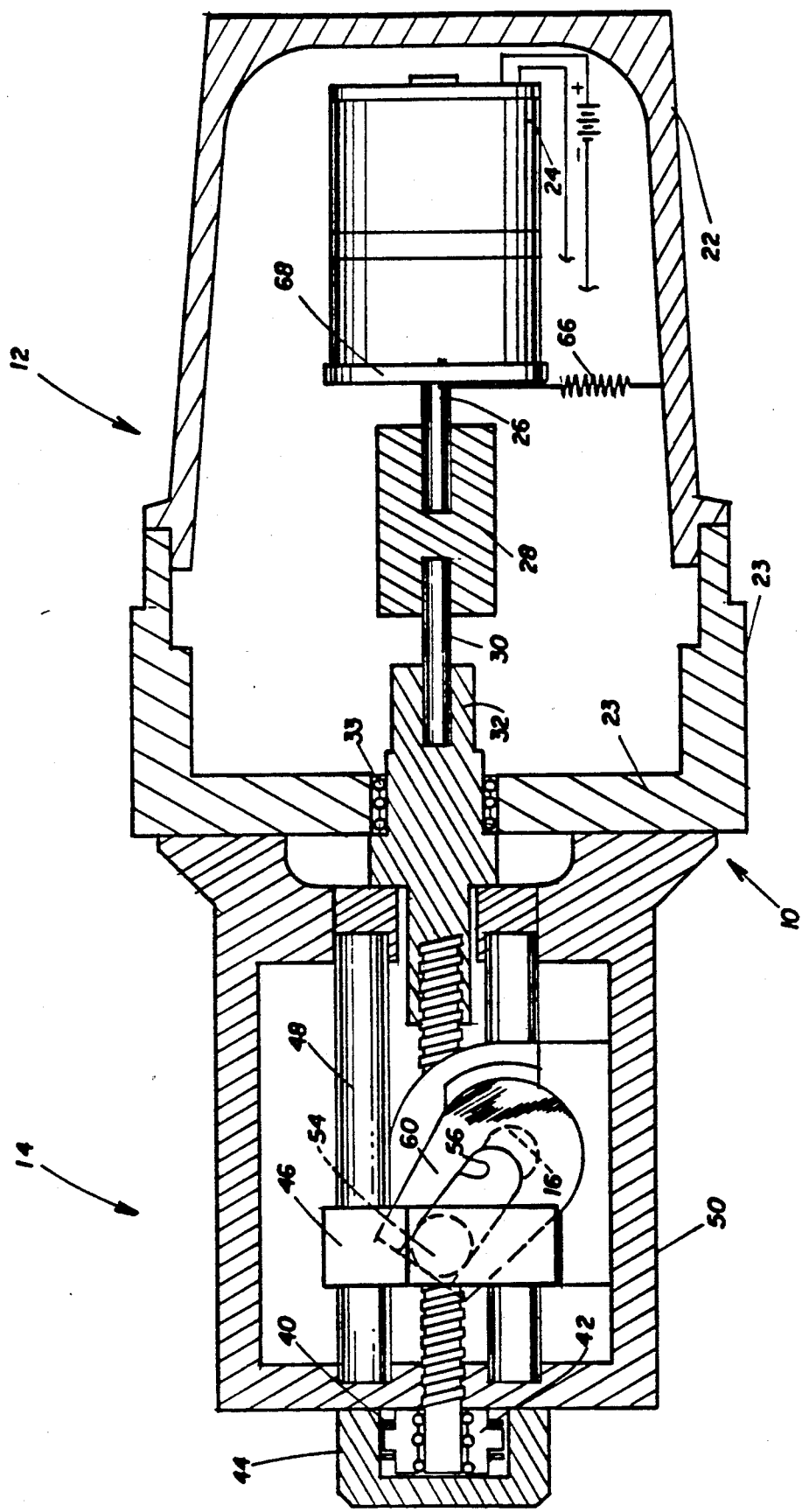
FIG. 1 is a top view partially broken away showing the low powered valve actuator of this invention.
Figure 2:
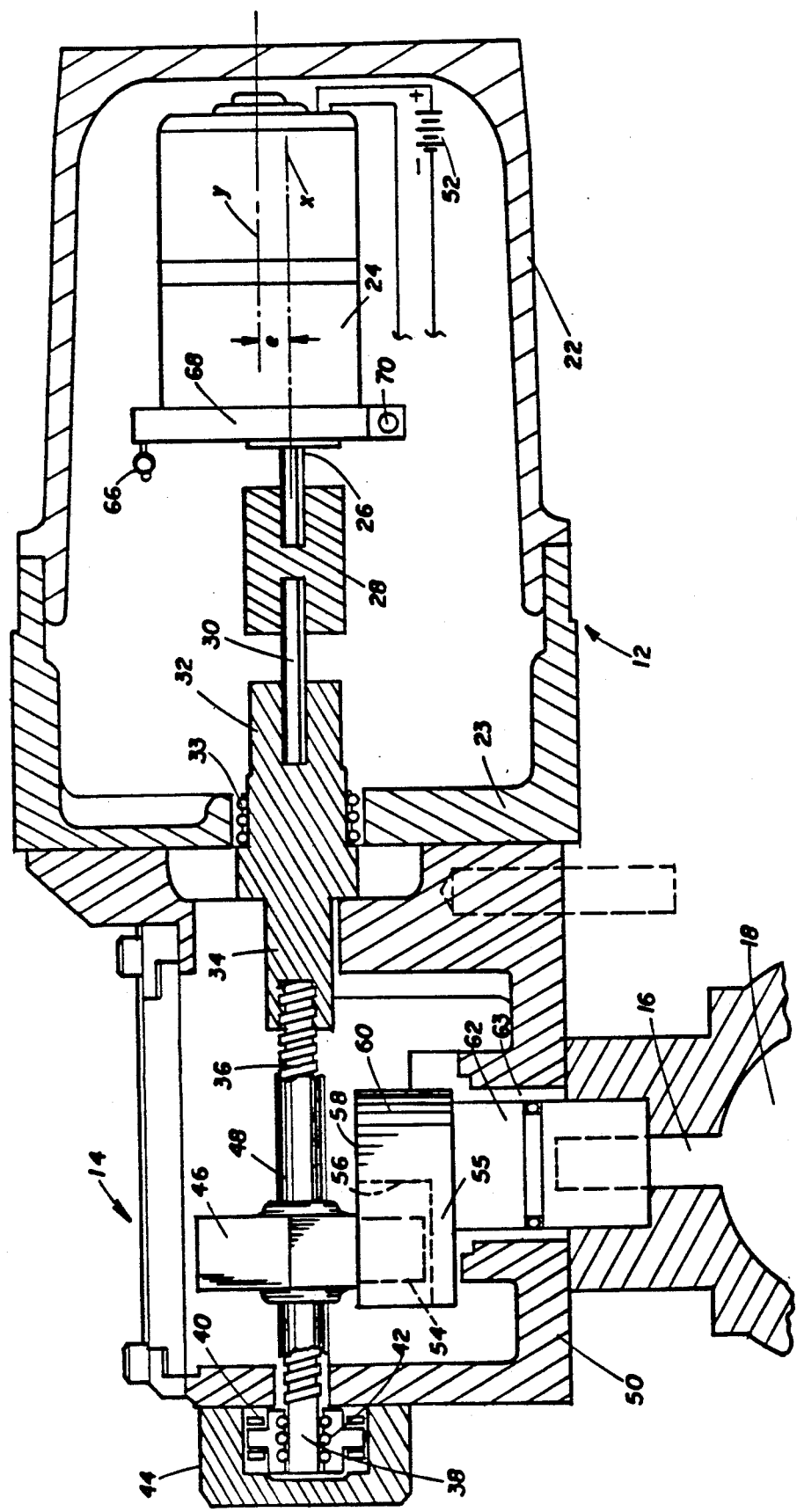
FIG. 2 is a side view of the valve actuator as mounted on a quarter turn valve.

Referring now to the drawings with greater particularity, the low power valve actuator 10 of this invention includes an electric motor input drive 12 and a mechanical output drive 14, which is capable of delivering a rotary output to the stem 16 of a quarter-turn valve, such as a ball valve 18 (FIG. 2). Of course it could also be applied to a cylindrical or tapered plug valve, or to a butterfly valve.

The motor drive unit 12 includes, as the source of power, a small electric motor 24, which is contained within a suitable waterproof, dust-proof housing 22 that is supported on the base 23. The electric motor 24 is internally geared to deliver a torque ratio of approximately 1:450. As shown in FIGS. 2 and 3, the axis x of the motor drive output shaft 26 axis is offset from the rotor axis y by the distance e to facilitate application of the motor torque during valve closing as a means to monitor and determine full valve seating, in a manner to be hereinafter described.

The motor drive output shaft 26 is connected by a first drive coupling 28 to a transition shaft 30, which in turn, is connected by a second drive coupling 32 to the input end 34 of an Acme thread drive screw 36. The coupling 32 is rotatably mounted in the frame or base 23, as in a rotary bushing or bearing 33. Hence, the motor 24 is supported in the frame or base 23 by reason of the mounting of the shaft 26, 30 in the bearing 33. Reactive rotation of the motor 24 is resisted by suitable spring means 66. The output end 38 of the rotating Acme screw 36 carries a thrust plate 40 that is rotatably carried in thrust bearings 42 secured within a housing 44 to hold the Acme threaded screw 36 against any axial movement.

A traveling block 46 is threadedly received on the Acme screw 36 so that rotary motion of the screw 36 is translated into linear movement of the traveling block 46, driving it along a pair of spaced parallel guide rods 48 on either side of it. The guide rods 48 are rigidly secured at opposite ends to the drive housing 50 so that the traveling block 46 is held against any turning or skewing with the screw 36, and is guided in a direct linear path through its full stroke. The drive motor 24 is energized from a suitable source, such as a 12 volt battery 52, and by reversing the polarity the direction of rotation of the drive screw 36, and hence, the direction of movement of the traveling block 46, will be reversed.

As shown in FIGS. 2 and 3, a motion transmitting pin 54 extends downward in cantilever fashion from the traveling block 44 to be received in a longitudinal groove 56 cut to extend downward from the top surface 58 of a scotch yoke lever 60. A journal 62, which depends from the scotch yoke 60 is rotatably received in a bearing 63 in the mechanical drive housing 50, and is adapted to be keyed or splined to the valve stem 16 of the valve 18. It is to be noted that the groove 56 does not extend completely through the Scotch yoke lever 60, whereby there is ample material 55 below the groove 56 to strengthen and reinforce the Scotch yoke lever 60 to prevent deflection thereof under forces transmitted by the cantilever pin 54 normal to the side surfaces of the groove 54. It is also to be noted that the groove 56 is well above the journal 62 and the valve stem 16 so that it can actually pass over or the axis of the valve stem 16, enabling a very short center to center distance between the motion transmitting pin 58 and the valve stem 16. The cantilever pin 54 is situated between the guide rods 36 so that all forces transmitted between the cantilever pin 54 and the Scotch yoke lever 54 are contained between the guide rods 36 to prevent any skewing of the traveling block 46.

There is a torque to torque mechanical advantage from the input end 34 of the Acme screw to the valve stem 16 of approximately 1:70 so that, when combined with the torque to torque ratio within the motor enclosure of approximately 1:450 there is a total ratio of in excess of 1:30,000. Referring now to FIGS. 3 and 4, the axis x of the motor output shaft is aligned with that of the Acme screw, and is eccentric with the axis y of the motor rotor shaft by the distance e. Because of the eccentricity, and because the motor reacts by rotating about its shaft axis x, the motor reaction to torque creates a potential displacement angle a (FIG. 4) which provides a unique method for sensing and monitoring torque. That is, as the motor output shaft 26 rotates in a clockwise direction, the motor 24 reacts in a counterclockwise direction as indicated by the arrow A. This reaction is opposed by the spring 66, which is secured at opposite ends to the motor 24, and to some stationary member, such as the housing 22.

As the torque reaction increases, the motor body rotates with it and rotates the reaction plate 68 away from the fixed stop 69 member against the spring 66. When the torque reaction reaches its maximum level, as when the valve is seated, the motor body 24 rotates to an angle at which the adjustable striker member 70 engages a switch 72 to deenergize the motor 24. By the same token, when the motor reverses in opening the valve 18, the output shaft 26 rotates in a counterclockwise direction, whereby the reaction of the motor housing 24 will be clockwise, but the reaction plate 68 will be prevented from rotating by the adjustable stop member 69 (FIG. 4).

It should be noted that while there is illustrated a tension spring 66, to oppose rotation of the motor 24, the necessary spring resistance may be accomplished by other means such as a torsion spring, which is secured at opposite ends to the motor and to some stationary member in the housing 22.

While this invention has been described in conjunction with a preferred embodiment thereof, it is obvious that modifications and changes therein may be made by those skilled in the art to which it pertains without departing from the spirit and scope of this invention, as defined by the claims appended hereto.

What is claimed as invention is:

1. A low power actuator for a quarter-turn valve comprising:
   a motor drive with output shaft;
   an Acme drive screw coupled to said output shaft;
   thrust bearing means rotatably receiving and drive screw while preventing axial movement thereof;
   a traveling block with Acme nut threaded on said drive screw;
   a pair of fixed, elongated guide members parallel to and on opposite sides of said drive screw slidably engaged by said traveling block to guide said traveling block in a fixed linear path and to prevent rotation thereof;
   a rotatable output member adapted to be mounted on the stem of a quarter-turn valve; and
   a motion converting device for converting linear movement of said traveling block into 90° rotary movement of said output member,
   said actuator also including:
   spring means holding said motor drive against rotation as torque increases;
   electrical switch means operable when engaged to de-energize said motor drive; and
   striker means operative when the torque produced by said motor reaches a predetermined level to engage said electrical switch.

2. The low power actuator defined by claim 1 including:
   a housing containing said motor drive;
   said spring means being secured at opposite ends to said housing and said motor;
   the rotor axis of said motor being offset from said output shaft.

3. A low power actuator for a quarter-turn valve comprising:
   a drive motor with a rotating output shaft;
   a rotatable output member adapted to be mounted on the stem of a quarter-turn valve;
   mechanical drive means converting rotary linear movement of said motor output shaft into 90° rotary movement of said output member;
   spring means holding said motor against rotation as torque increases;
   electrical switch means operable when engaged to deenergize said motor; and
   striker means operative when the torque produced by said motor reaches a predetermined level to engage said electrical switch.

4. The low power actuator defined by claim 3 including:
   a housing containing said drive motor;
   said spring means being secured at opposite ends to said housing and said motor;
   the rotor axis of said motor being offset from said output shaft.

* * * * *